(12) United States Patent
Moss

(10) Patent No.: US 7,738,177 B2
(45) Date of Patent: Jun. 15, 2010

(54) LIGHT SOURCE

(75) Inventor: Graham Harry Moss, Chadderton (GB)

(73) Assignee: Digital Projection Limited (GB)

( * ) Notice: Subject to any disclaimer, the term of this patent is extended or adjusted under 35 U.S.C. 154(b) by 0 days.

(21) Appl. No.: 11/905,975

(22) Filed: Oct. 5, 2007

(65) Prior Publication Data

US 2008/0094721 A1 Apr. 24, 2008

(30) Foreign Application Priority Data

Oct. 9, 2006 (GB) .................................. 0619943.4

(51) Int. Cl.
*G02B 27/14* (2006.01)
*G02B 27/10* (2006.01)
(52) U.S. Cl. ....................... 359/638; 359/618
(58) Field of Classification Search ................. 359/290, 359/291, 237, 618, 630, 638; 362/511, 552–554
See application file for complete search history.

(56) References Cited

U.S. PATENT DOCUMENTS 5,319,496 A * 6/1994 Jewell et al. ................. 359/741
5,568,315 A 10/1996 Shuman ....................... 359/487
6,005,717 A 12/1999 Neuberger et al. .......... 359/619
6,227,682 B1 5/2001 Li ............................... 362/302
6,259,713 B1 7/2001 Hwu et al. ..................... 372/36
6,488,379 B2 12/2002 Kane ............................. 353/94
6,499,863 B2 12/2002 Dewald ....................... 362/268
7,386,214 B1 * 6/2008 Cianciotto ................... 385/133
2002/0114158 A1 8/2002 Chuang ....................... 362/243
2008/0013185 A1 * 1/2008 Garoutte et al. ............. 359/630

FOREIGN PATENT DOCUMENTS

| EP | 0 646 284 B1 | 3/2000 |
| GB | 2 151 808 A | 7/1985 |
| WO | WO 93/26034 | 12/1993 |
| WO | WO 98/37448 | 8/1998 |
| WO | WO 00/31578 | 6/2000 |

* cited by examiner

*Primary Examiner*—Mohammed Hasan
(74) *Attorney, Agent, or Firm*—Finnegan, Henderson, Farabow, Garrett & Dunner LLP

(57) ABSTRACT

A light source for use in a projection system comprises a pair of lamps each effective to produce a substantially collimated beam. Part of the light emitted by each lamp is directed through the light originating part of the same, or another, lamp. A light combiner is arranged within the path of the light beams from each of the two lamps to provide a composite light beam of a cross section less than the sum of the cross section of the beams produced by each of the lamps.

17 Claims, 6 Drawing Sheets

US 7,738,177 B2

LIGHT SOURCE

BACKGROUND OF THE INVENTION

Field of the Invention

This invention relates to light sources. The invention has particular, although not exclusive, relevance to light sources for producing a beam of light for illuminating a spatial light modulator, the spatial light modulator producing a spatially modulated beam of light which may be projected onto a display screen. The spatial light modulator may take several forms, for example a digital micro-mirror device also known as a Deformable or Deflectable Mirror Device (DMD), or a Liquid Crystal Device (LCD).

U.S. Pat. No. 6,227,682 discloses an image projection system. The system has a single lamp in an arrangement for focussing light from the lamp onto a homogeniser of the projection system. A first parabolic reflector directs a parallel beam onto a second parabolic reflector which concentrates the light onto the homogeniser. A reflector may be provided to reflect back into the first reflector light which would otherwise be lost. That increases the light flux at the homogeniser.

In order to provide a sufficiently intense light beam to address a digital micro-mirror device, it has been known to use, as a light source, an arc lamp to produce a substantially parallel output beam. One example of such an arc lamp is described in European Patent EP 0646284. Other suitable arc lamps are available including high pressure mercury arc lamps and xenon arc lamps. In order to increase the intensity of the light produced by the light source, it would be useful to be able to combine the output of two or more lamps to produce a single light beam. This would be particularly useful where a backup facility is required to prevent a total loss of output if one of the lamps should fail. However there are a number of problems when the outputs from multiple lamps are combined. If the lamps are arranged next to each other such that the beams emitted from the multiple lamps are parallel to each other, there is an increase in beam diameter. Alternatively if the lamps are arranged such that the beams overlap, this reduces the problem of an increase in beam diameter but increases the divergence of the beam compared to that of a beam emitted from a single lamp.

US 2002/0114158 discloses an illuminating apparatus for a liquid crystal projection display. A plurality of lighting members are arranged in a ring. Each lighting member includes a light source and a parabolic reflector which produces forwardly directed parallel light rays. A first reflector is disposed in front of the ring of lighting members. It has a central region formed with an opening, and a peripheral region around the central region and aligned with the lighting members. The peripheral region is formed with a curved first reflecting surface that reflects the beams from the lighting members to converge rearwardly. A second reflector is disposed behind the first reflector and is registered with the central opening in the first reflector. The second reflector is formed with a curved second reflecting surface that faces the opening such that the light rays reflected from the first reflecting surface of further reflected by the second reflecting surface through the opening. The apparatus has a large volume. The effect of combining the beams into a single beam increases the beam angle and thus increases losses.

SUMMARY OF THE INVENTION

It is an object of the present invention to provide a light source in which the optical outputs of two or more lamps are combined, but in which the resultant increase in beam diameter and divergence angle may be reduced.

According to a first aspect of the present invention there is provided a light source comprising:

a plurality of beam producers each effective to produce a substantially collimated beam, an arrangement for directing part of the light emitted by each beam producer through the light originating part of the same or another beam producer, and a light combining means being arranged within the path of the light beam from each of said beam producers so as to provide a composite light beam of a cross section less than the sum of the cross sections of the beams produced by each of the beam producers.

In an embodiment, each lamp is a discharge lamp for producing an approximately point source of light. The lamp is for example an arc lamp. The arc lamp may be a short-arc lamp which produces a substantially point source of light.

An embodiment comprises an integrator arranged to receive the composite light beam.

In an embodiment, at least two of the beam formers are opposed.

In an embodiment, each beam former comprises a discharge lamp and a reflector, which may be integral with, or separate from, the lamp, for producing the collimated beam. The reflector may be a parabolic reflector.

According to a second aspect of the present invention there is provided a projection system including a light source according to the first aspect of the present invention arranged to illuminate a spatial light modulator.

BRIEF DESCRIPTION OF THE DRAWINGS

A number of illustrative embodiments of the invention will now be described, by way of example only, with reference to the following figures in which.

DESCRIPTION OF THE EMBODIMENTS

First Embodiment

Figure 1:
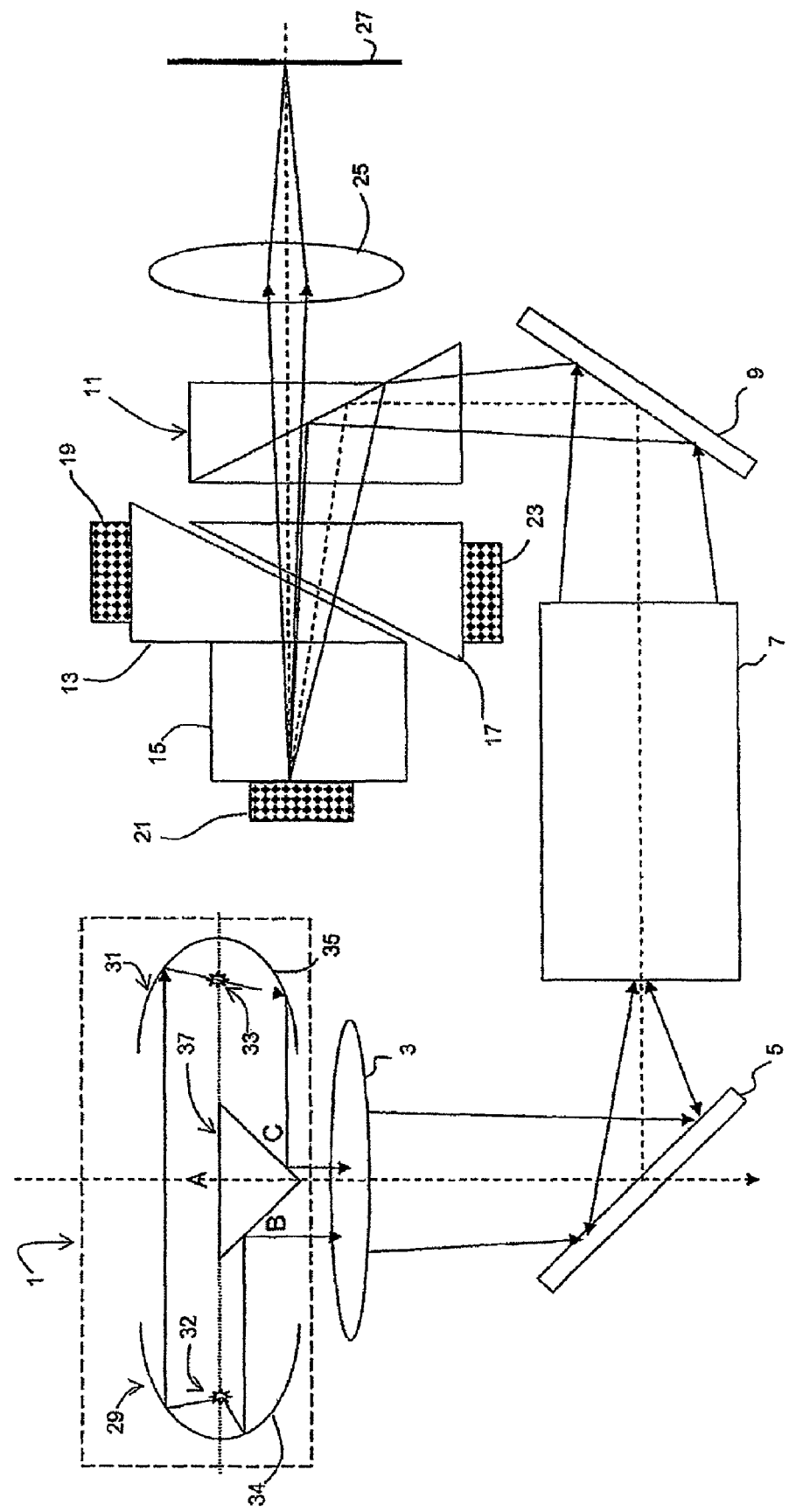
FIG. 1 is a schematic plan view of the optical system layout for a projection system incorporating a light source in accordance with a first embodiment of the present invention.

Turning firstly to FIG. 1, the embodiment of the projection system to be described, includes a light source 1 indicated by the dashed line box in FIG. 1, a condenser lens 3, a mirror/filter 5, an integrator and relay system 7 a folding mirror 9, an input/output beam separation prism system 11, a set of three colour splitting prisms 13, 15, 17 on each of which is mounted a respective DMD 19, 21, 23, and a projection lens 25. The projection system is arranged to project an image on to a display screen 27 which is also shown in FIG. 1.

In use of the system, light from the light source passes from the light source 1 and is focussed by the condenser lens 3, via the mirror/filter 5, onto the input face of the integrator and relay system 7. The mirror/filter 5 includes coatings which are effective to transmit incident infra-red and ultra violet light such that infra-red and ultra violet light is directed away from the projection system and does not enter into the integrator and relay system 7. The integrator and relay system 7 is effective to make the light distribution across the beam of light produced by the light source 1 more uniform, to match the aspect ratio of the cross-section of the beam to the aspect ratio of each DMD 19, 21, 23 and to focus the light transmitted through the integrator and relay system 7 onto each of the DMDs. The colour splitting prisms 13, 15, 17, include dichroic surfaces (not shown) effective to split the white light produced by the illumination system 1, into the three colours red, green and blue, the colour splitting prisms being effective to direct light within each of the three colour wavelength bands onto a different one of the three DMDs 19, 21, 23. Such a prism arrangement is described in detail in, for example, EP 0746948.

Each DMD 19, 21, 23 comprises an array of deflectable mirror elements (not shown), each mirror element being mounted on a torsion element over a control electrode (not shown). An electrical address system (not shown) is used to apply an electric field derived from an input video signal between each mirror element and the associated control electrode. This causes the mirror element to pivot, thus changing the direction of light reflected from the mirror element. Thus each mirror element may be caused to reflect light either in an "on" direction towards the projection lens 25 for projection on the display screen 27, or in an "off" direction towards a beam dump (not shown). This results in the light directed onto each DMD 19, 21, 23 becoming spatially modulated with a required image in each colour wavelength band.

The input/output beam separation prism 11 includes a totally internally reflective surface effective to direct light from the light source 1 onto the colour splitting prisms 13, 15, 17 but to direct the light output from the colour splitting prisms 13, 15, 17 after reflection by the DMDs 19, 21, 23, towards the projection lens 25, such that light which has been spatially modulated by each DMD 19, 21, 23 is recombined to form a multi-wavelength image which is projected by the projection lens 25 onto the display screen 27.

Figure 2:
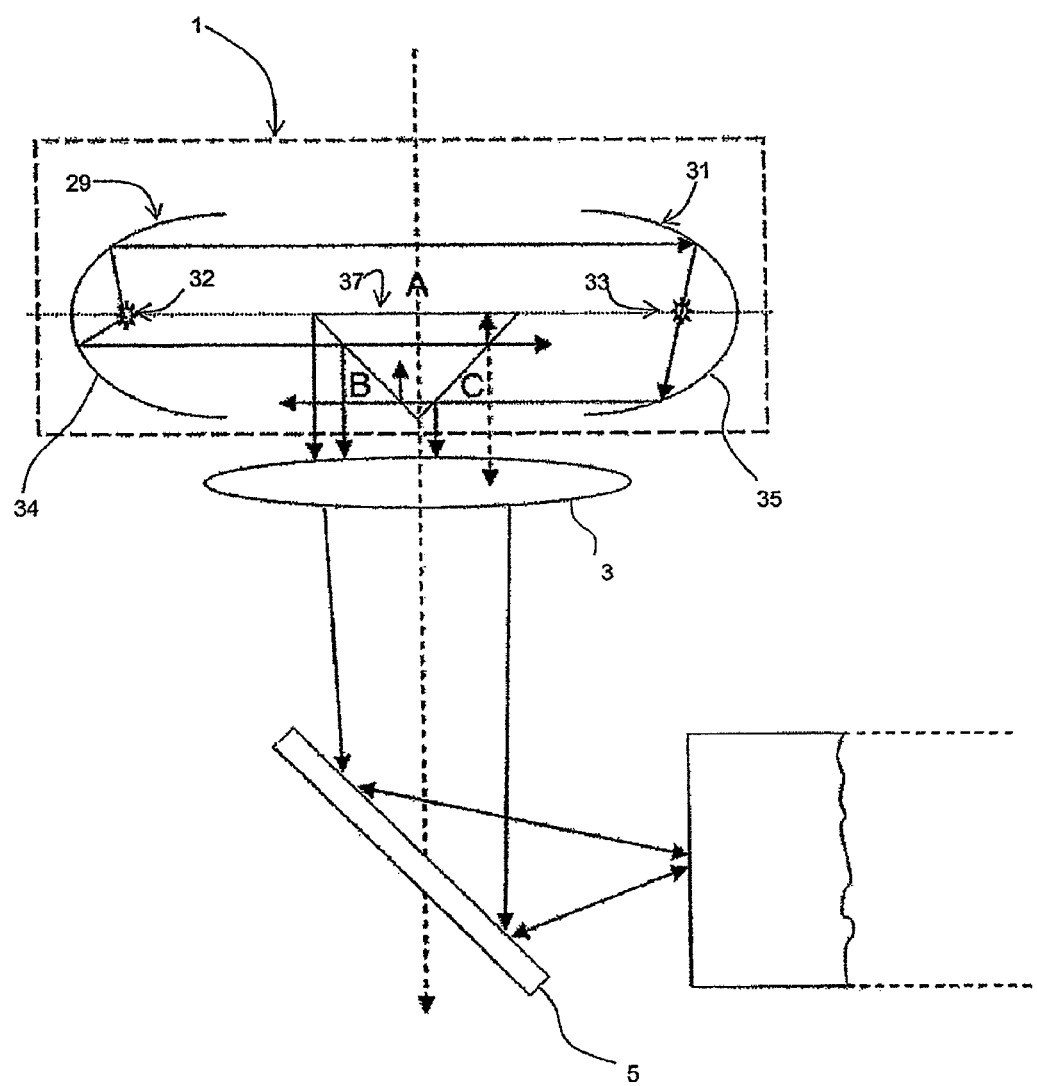
FIG. 2 illustrates part of the optical system layout of FIG. 1 on an enlarged scale.

Turning now also to FIG. 2 which shows an enlarged image of the light source 1, the light source 1 incorporates two opposed light beam producers which produce respective substantially collimated beams. Each beam producer comprises a lamp 29, 31, which is an incoherent light source. The lamp may be a discharge lamp, for example an arc lamp, preferably a short-arc lamp which produces a substantially point source of light. The effectively point light source 32, 33 is arranged at the focus of a respective parabolic reflector 34, 35 of the light beam producer so as to produce the substantially collimated beam. The producer may be of a closed beam configuration, incorporating a glass window (not shown) and provided with a effective cooling system (not shown). An example of a suitable light beam producer is described in EP 0646284. In the example of EP 0646284 the reflector is integral with the lamp. Alternatively, the arc lamp and the reflector may be separate items.

Interposed in the light path between the two beam producers 29, 31, there is provided a triangular cross section prism 37, having one surface, A, coaxial with the optical axis between the two reflectors 29, 31 such that the light beam emitted from the upper half of each beam producer is reflected back from the opposing reflector 33, 35 of the opposite beam producer. The prism 37 has two further rectangular surfaces, B, C, which are fully or partially reflective and which are arranged at 45 degrees to the optical axis between the two beam producers 29, 31 so as to intercept light emitted from the two beam producers 29, 31 and to reflect at least part of the light towards the condenser lens 3. The prism 37 is dimensioned so as to encompass half the beam "footprints" as produced by the arcs in each of the beam producers 29, 31. Each beam "footprint" will be a circle, assuming each beam producer has a circular aperture, the prism 37 therefore being effective to transmit a beam having a semicircular "footprint".

Thus light transmitted from each beam producer 29, 31, which either misses the prism 37 or passes through the prism 37 will be reflected at the opposing parabolic reflector 35, 34 back through the point source 32, 33 and will either be reflected into the output beam by the prism 37, or pass through the prism 37 to be re-reflected at the original parabolic reflector 32, 33 dependent on the reflectivity of the surfaces B, C. This re-reflection, or re-circulation of the light, is particularly beneficial as re-emitted light will have less aberrations than light transmitted directly from the beam producer 29 or 31 and furthermore the temperature of the point sources 32, 33 will be increased causing more efficient operation of the lamps. The result of this arrangement is to provide an elliptical light source aperture in the case of the reflectors 34, 35 being parabolic, typically a circular light aperture.

Furthermore, the size of the aperture will depend on the position of the prism 37 relative to the optical axis between the two beam producers 29, 31.

Alternatively the reflectors may be parabolic, but produce a rectangular aperture by causing the light spots produced by each lamp to be offset laterally. This will be useful where the integrator rod 7 has a rectangular entrance surface.

It will be appreciated that the reflectors 34, 35 need not be parabolic. In particular in order to minimise aberrations from non-point sources, aspheric or general power series perturbations can be made to the form of the reflectors to produce as near a collimated beam from each lamp as possible. The reflectors may be facetted reflectors.

The shapes of the reflective surfaces B and C can be made so as to match the aspect ratio of the DMDs 19, 21, 23 to be illuminated. This will minimise light loss. The position of the prism 37 can be varied relative to the optical axis between the two beam producers 29, 31, so as either to reduce the overall size of the system or optimise the light output taking account of the spatial intensity of the light emitted by the lamps which is not normally uniform. The prism 37 may also be tilted so as to vary the output intensity and the output direction of the beam at the same time.

It will be appreciated that by use of suitable reflective coatings on the surfaces B, C, the light source may be made bidirectional as indicated by the arrows pointing away from the condenser lens 3 in FIG. 2. Furthermore, the reflective coatings may be made wavelength selective, so as to colour filter some of the light and remove it from the output beam.

In one particular example using two lamps each having an output of 4150 lumens, a combined output of 8200 lumens could be achieved.

Second Embodiment

Figure 3:
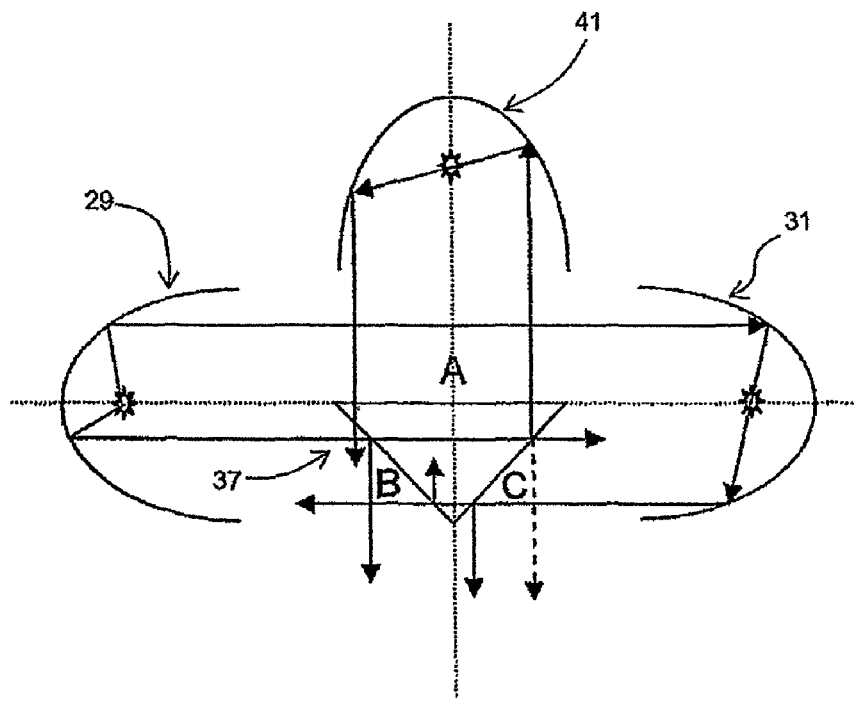
FIG. 3 is a schematic plan view of a light source in accordance with the second embodiment of the present invention.

FIG. 3 shows a variation of the arrangement shown in FIGS. 1 and 2, in which a further beam producer 41 has been introduced into the illumination system 1. The beam producer 41 comprises a lamp and reflector as described above with reference to the other embodiments. The rest of the projection system is as in FIGS. 1 and 2 and like components are correspondingly labelled.

In the second embodiment, the light beam emitted from the third beam producer 41 is directed through the prism 37 to combine with the output beam produced by the other two beam producers 29, 31. If surface A of the prism 37 is made partially reflective, light may be reflected back to the third beam producer 41 for re-circulation.

Third Embodiment

Figure 4:
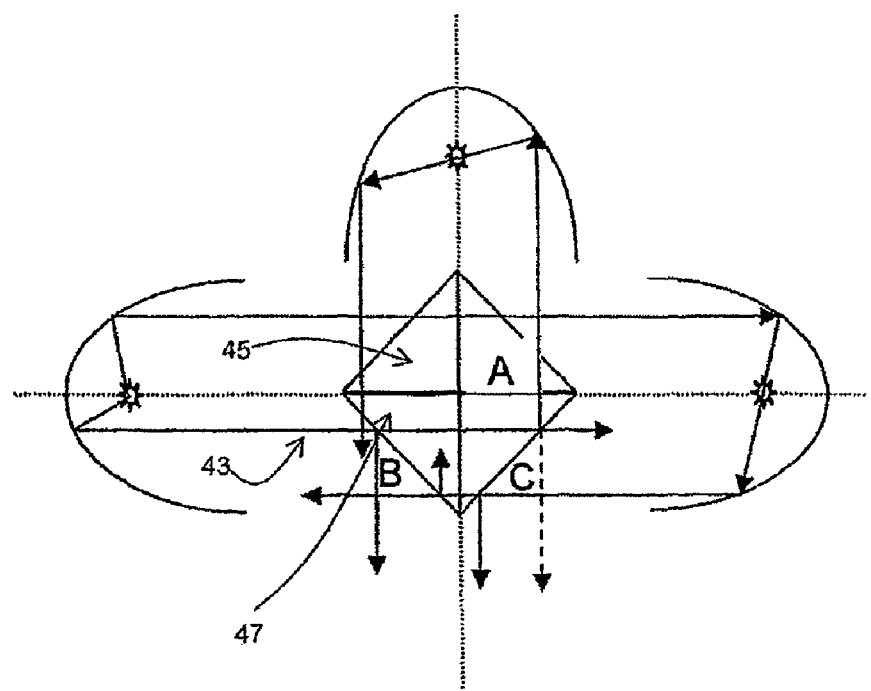
FIG. 4 is a schematic plan view of a light source in accordance with a third embodiment of the present invention.

FIG. 4 shows a variation of the second embodiment in which the prism 37 has been replaced by a beam combiner 43 having a square cross section. The beam combiner 43 may have internal interfaces 45, 47 which may include partially reflecting surfaces which are wavelength selective so as to reflect unwanted wavebands back into the optical system.

Fourth Embodiment

The aperture of each beam producer and the nature of each lamp can affect the divergence of the beam from the beam producer making it asymmetric about the optical axis. If this is the case the beam divergence may be larger in the plane including the optical axis between the two beam producers 29, 31 and the optical axis of the beam directed towards the condenser lens 3 than in the plane perpendicular to it.

The integrator and relay system 7 may take the form of an integrator rod, although there are other possibilities such as lenticular lens plates. Light entering the integrator rod propagates through the rod, by means of multiple reflections through internal surfaces of the rod. The number of reflections which the light inside the rod undergoes is dependent on the angle of incidence of the light on the input surface and the length of the rod. Transmission of the light from the light source 1 through the integrator rod, transforms the original non uniform distribution of light at the input surface of the integrator rod, into a more uniform light distribution at the output surface of the integrator rod.

Figure 5:
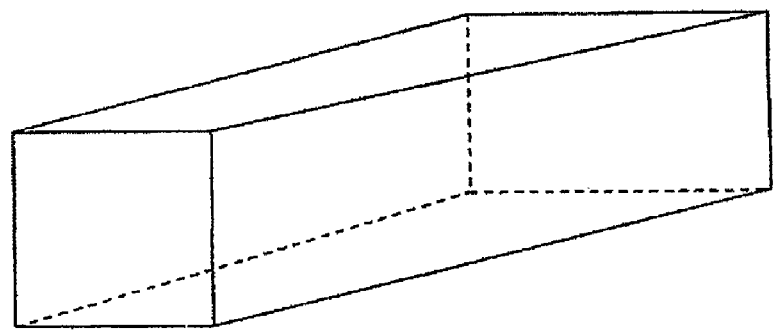
FIG. 5 illustrates the form of an integrator rod incorporated in the integrator and relay system of FIG. 1.

The integrator rod is usually of cuboid shape. However the aspect ratios of the input and output surfaces may vary so as to vary the aspect ratio of the light transmitted by the rod. The integrator rod shown in FIG. 5 has a square entrance surface and a rectangular exit surface of an aspect ratio matched to the aspect ratio of each DMD 19, 21, 23. This results in the following optical system having an asymmetric angular acceptance, in which case the largest beam angle from the light source 1 may not match the largest acceptance angle of the following optical system.

Whilst the beam producers may be rotated in order to match the asymmetry of the beam emitted by the light source to the acceptance angle of the following optical system, there may be a limitation on the orientation of the lamps for thermal or other mechanical reasons. In this case it is not possible to rotate the lamps and thus the beam producers to match the preferred acceptance angle of the projector optical system.

Figure 6A:
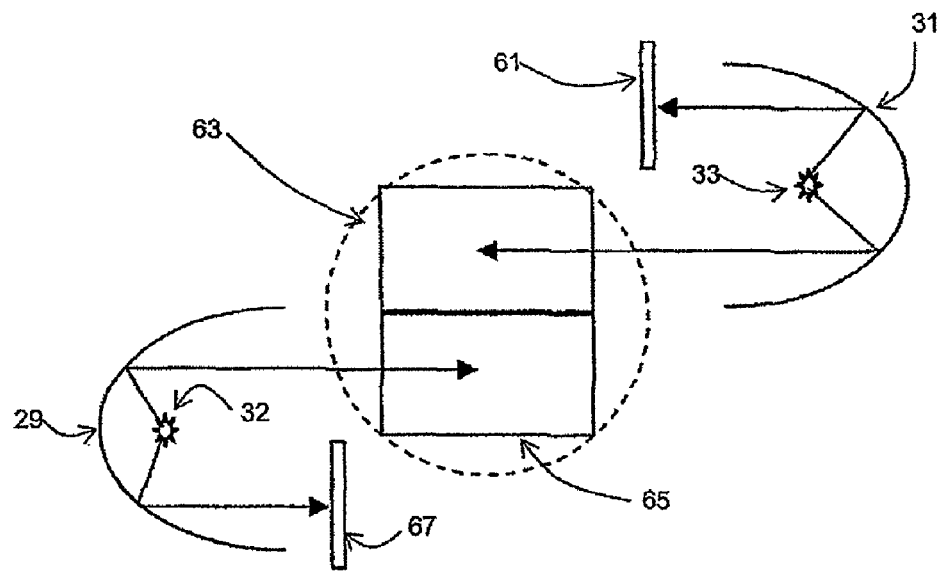
FIG. 6A is a schematic side view of a light source in accordance with a fourth embodiment of the present invention.
Figure 6B:
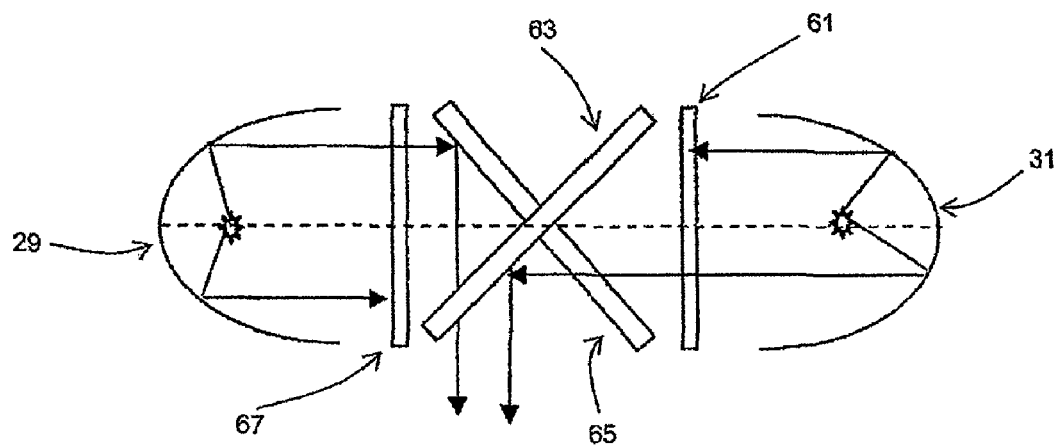
FIG. 6B is a schematic plan view of the light source of FIG. 6A.

These problems can be addressed by use of an offset system which rotates the asymmetric beam diversion by ninety degrees. As illustrated in FIG. 6A the foci of the beam producers 29,32 are offset from each other such that the beams emitted by the two beam producers 29, 31 are directed towards each other and are parallel each other but are offset in the vertical plane. In the upper beam producer 31, light above the optical axis of the lamp 31 is recycled back into the lamp of same producer by a plane mirror 61, whilst light below the optical axis passes beneath the mirror 61 to be reflected by the uppermost 63 of a pair 63, 65 of crossed plane mirrors set at forty five degrees to the beam as best seen in FIG. 6B. In the lowermost beam producer 29, light below the optical axis of the lamp 29 is reflected by a plane mirror 67 back into the lamp of the lowermost producer 29 whilst the light above the optical axis of the lamp 29 is reflected at the lowermost 65 of the crossed mirrors 63, 65, which is set at forty five degrees to the beam so that it is combined with the beam from the uppermost of the crossed mirrors 63.

Thus the light source will have an output aperture as indicated by the dotted circle in FIG. 6A of a size equivalent to that which would have been produced by a single lamp. The use of the plane mirrors 61, 67 will reduce the losses in the system.

Figure 7:
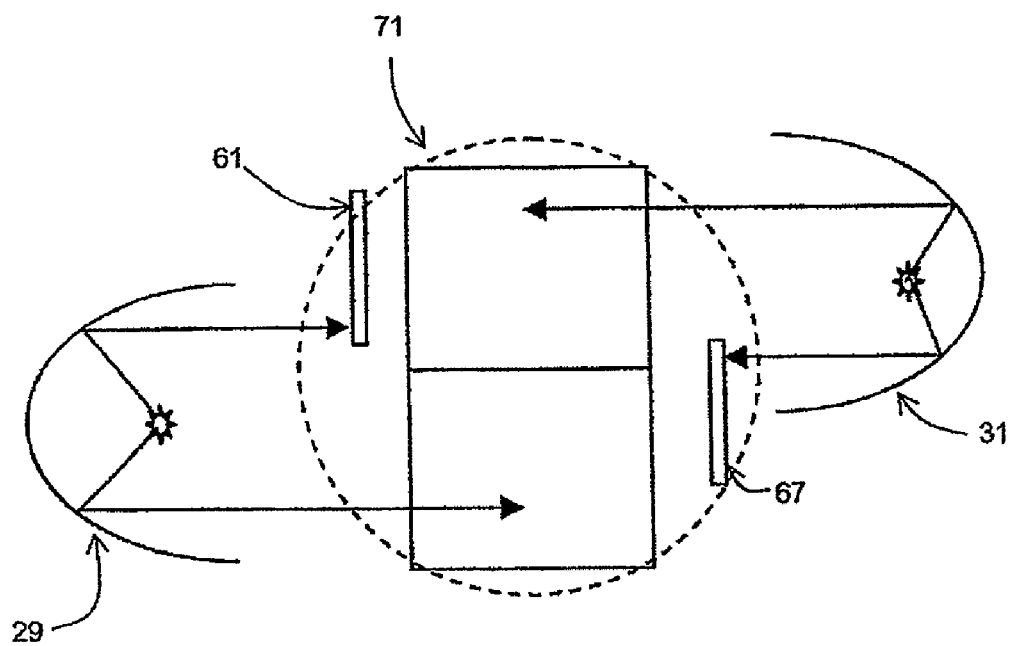
FIG. 7 is a schematic side view of the optical system layout of a light source in accordance with a variation of the fourth embodiment shown in FIGS. 6A and 6B.

Turning now to FIG. 7, in a alternative arrangement of the fourth embodiment, the two beam producers 29, 31 may be shifted such that the crossed mirrors 63, 65 are each arranged to intercept light from more than half of each of the beam producers 29, 31, the two plane mirrors 61, 67 intercepting the remaining light. It will be appreciated however that this will increase the output aperture of the illumination system as indicated by the dotted line 71 in FIG. 7.

Fifth Embodiment

It will be appreciated that in each of the embodiments described above, light from each beam producer 29, 31 is re-circulated through an opposing producer 31, 29. It may be advantageous to allow re-circulation only through the originating beam producer as an increased beam divergence may occur due to the increased path length after the light has left the originating lamp.

Figure 8A:
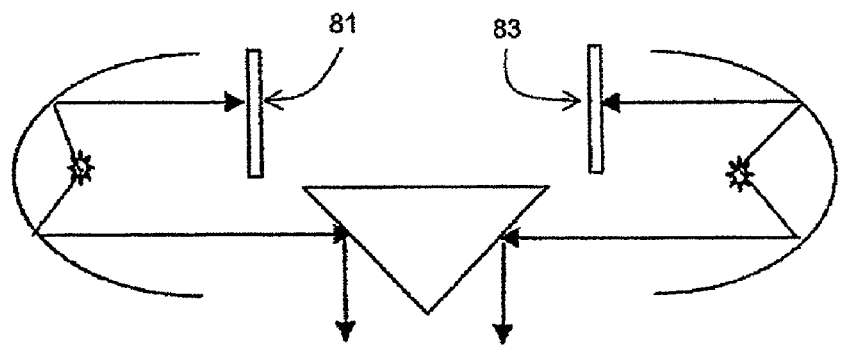
FIG. 8A is a schematic plan view of a light source in accordance with a fifth embodiment of the present invention.
Figure 8B:
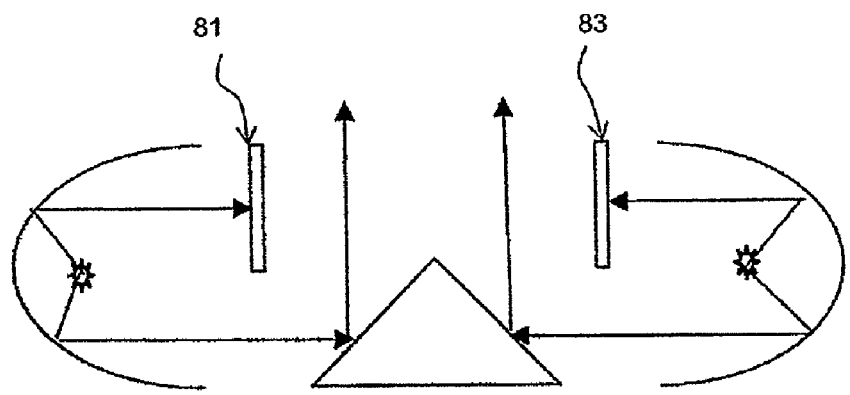
FIG. 8B is a schematic plan view of a light source in accordance with a variation of the light source shown in FIG. 8A.

FIGS. 8A and 8B illustrate arrangements in which the prism 37 and two plane mirrors 81, 83 are arranged such that light is re-circulated only via the originating beam producer.

The invention claimed is:

1. A light source comprising:
   a pair of light beam producers each effective to produce a substantially collimated beam;
   an arrangement for directing part of light emitted by each of the pair of light beam producers through a light originating part of the same or another light beam producer; and
   a light combiner arranged within paths of light beams produced by the pair of light beam producers so as to provide a composite light beam of a cross-section less than a sum of cross sections of the light beams produced by the pair of light beam producers,
   wherein a first direction of the substantially collimated beam produced by a first light beam producer of the pair of light beam producers and a second direction of the substantially collimated beam produced by a second light beam producer of the pair of light beam producers are substantially parallel and opposite to each other.

2. A light source according to claim 1, wherein each of the pair of light beam producers includes a discharge lamp for producing an approximately point-source of light.

3. A light source according to claim 2 wherein the discharge lamp is an arc lamp.

4. A light source according to claim 3, wherein the arc lamp is a high pressure mercury arc lamp or a xenon arc lamp.

5. A light source according to claim 1, wherein the first light beam producer of the pair of light beam producers comprises a discharge lamp and a reflector for producing the substantially collimated beam.

6. A light source according to claim 5, wherein the discharge lamp is integral with the reflector.

7. A light source according to claim 5, wherein the discharge lamp and the reflector are separate.

8. A light source according to claim 1, wherein said directing arrangement includes, for the first light beam producer of the pair of light beam producers, a reflector for reflecting a portion of a light beam produced by the first light beam producer from the first light beam producer back into the first light beam producer.

9. A light source according to claim 8, wherein the pair of light beam producers are opposed.

10. A light source according to claim 1, wherein the pair of light beam producers are opposed so that the part of the light emitted by each of the pair of light beam producers passes through the light originating part of the other of the pair of light beam producers.

11. A light source according to claim 1, including wavelength dependent reflective surfaces in the light path from said pair of light beam producers and effective to direct light of unwanted wavelengths in a direction away from said composite light beam.

12. A light source according to claim 1, in combination with an integrator arranged to receive the composite light beam.

13. A projection system including a light source according to claim 1, arranged to illuminate a spatial light modulator.

14. A light source according to claim 1, wherein the pair of light beam producers are located on the opposite sides of the light combiner.

15. A light source comprising:
a pair of light beam producers each effective to produce a substantially collimated beam;
an arrangement for directing part of light emitted by each of the pair of light beam producers through a light originating part of the same or another beam producer; and
a light combiner arranged within paths of light beams produced by the pair of light beam producers so as to provide a composite light beam of a cross-section less than a sum of cross sections of the light beams produced by the pair of light beam producers,
wherein said directing arrangement includes, for a first light beam producer of the pair of light beam producers, a reflector for reflecting a portion of a light beam produced by the first light beam producer from the first light beam producer back into the first light beam producer, and wherein the pair of light beam producers are opposed, and optical axes of the pair of opposed light beam producers are offset laterally such that the optical axes are parallel with each other but not coincident, a part of each beam impinging on the light combiner and comprising reflectors for reflecting other parts of each beam back into the pair of light beam producers.

16. A light source comprising:
a pair of light beam producers each effective to produce a substantially collimated beam;
an arrangement for directing part of light emitted by each of the pair of light beam producers through a light originating part of the same or another beam producer;
a light combiner arranged within paths of light beams produced by the pair of light beam producers so as to provide a composite light beam of a cross-section less than a sum of cross sections of the light beams produced by the pair of light beam producers; and
a third light beam producer effective to produce a substantially collimated beam directed at the light combiner, the light combiner being arranged within the paths of the light beams produced by the pair of light beam producers as well as a path of a light beam produced by the third light beam producer so as to provide the composite light beam of a cross-section less than the sum of the cross sections of the light beams produced by the pair of light beam producers and the third light beam producer.

17. A light source comprising:
a pair of light beam producers each effective to produce a substantially collimated beam;
an arrangement for directing part of light emitted by each of the pair of light beam producers through a light originating part of the same or another beam producer; and
a light combiner arranged within paths of light beams produced by the pair of light beam producers so as to provide a composite light beam of a cross-section less than a sum of cross sections of the light beams produced by the pair of light beam producers,
wherein the light combiner is a prism arrangement having two, at least partially, reflective surfaces arranged in the paths of the light beams produced by the pair of light beam produces, so as to reflect the light beams produced by the pair of light beam producers into said composite light beam.

* * * * *